(12) United States Patent
Oberhauser et al.

(10) Patent No.: US 6,336,215 B1
(45) Date of Patent: Jan. 1, 2002

(54) APPARATUS AND METHOD FOR ON-LINE CODE ONLY REPLACEMENT OF A RUNNING PROGRAM USING CHECKPOINTS

(75) Inventors: Roy T. Oberhauser, Santa Clara; Michael Lawrence Saboff, San Jose, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/192,088

(22) Filed: Nov. 13, 1998

(51) Int. Cl.$^7$ .............................................. G06F 9/445
(52) U.S. Cl. ................. 717/11; 717/2; 717/3; 717/4
(58) Field of Search ................. 717/1, 2, 3, 4, 717/11

(56) References Cited

U.S. PATENT DOCUMENTS 5,027,316 A * 6/1991 Frantz et al. .................. 710/11
5,974,454 A * 10/1999 Apfel et al. ................ 709/221
6,073,214 A * 6/2000 Fawcett ....................... 711/133

OTHER PUBLICATIONS

Okamoto, "Dynamic Program Modification in the Non–stop Software Extensible System (NOSES)", IEEE, pp. 1779–1783, May 1994.*

Conradi et al., "Version models for software configuration management", ACM Computing Surveys, vol. 30, No. 2, pp. 232–282, Jun. 1998.*

Heering et al., "Lazy and Incremental Program Generation", ACM Transactions on Programming Languages and Systems, vol. 16, No. 3, pp. 1010–1023, May 1994.*

Wiggins, "An Overview of Program Visualization Tools and Systems", ACM, pp. 194–200, Apr. 1998.*

Griswold, "Direct update of data flow representations for a meaning–preserving program restructuring tool", ACM, pp. 42–55, Dec. 1993.*

* cited by examiner

*Primary Examiner*—Tuan Q. Dam
*Assistant Examiner*—Ted T. Vo

(57) ABSTRACT

An apparatus and method are provided for on-line code replacement of a program running in a process. The apparatus and method utilizes a variant of the exec system call, which will be referred to as a text-only exec. The present invention, utilizing a checkpoint methodology, allows the programmer maximum flexibility in addressing upgrade/replacement program issues and determines where, when and how the transition to a new version of a program should occur with least impact to the services.

20 Claims, 6 Drawing Sheets

APPARATUS AND METHOD FOR ON-LINE CODE ONLY REPLACEMENT OF A RUNNING PROGRAM USING CHECKPOINTS

BACKGROUND OF THE INVENTION

1. Field of the Invention

The present invention is generally related to a system of processing software programs directed to computer operations and, more particularly, is related to a system and method for replacing a running program's code within the same process in software.

2. Description of Related Art

As known in the computer and software arts, software programs undergo many changes during its product life. The changes either enhance the system through updates or remove problems (i.e., bugs) from the program steps. In either circumstance, the software program must be replaced with a new version of the program.

Typically, when a software program is replaced with a new version, the old version of the program is terminated and the new version is started. This procedure, however, creates the problem where the program operation is interrupted for some time period.

While there are some solutions for on-line software version changes, these techniques suffer from the following problems. One problem is that operating systems designed to allow software program updates on-line or on-the-fly, must use indirect addressing tables to link different modules together utilizing complicated mechanisms. The use of indirect addressing tables impacts the performance of the overall system software.

The prior art also suffers the problem of transferring the state from the old process to the new process, along with transferring control using the stack monitoring system. However, this transferring of the state to the new version program in the new process suffers the following performance problems.

First, the main function of the program can never change in the old version or the new version.

It is also assumed that while the stack can be used and transferred from the old program in the old process to the new program in the new process, it implies that no new procedure area layers can be added because they would cause errors in the processing since they would be returning to procedures at different addresses.

Furthermore, when transferring control from an old version of a program in an old process to a new version of a program in a new process, the assumption that the program counter can be converted implies that the offset to a function or procedure may never change due to the offset addressing within the version of the program.

Transferring from an old program/process to a new version program/process also assumes that no extra global or static variables can be added or deleted since this would cause errors in the execution of the new program/process.

Next, the transfer from an old program/process to a new version program/process implies that the addresses of the data remain constant across the two version, i.e., there is no reordering or optimization changes, etc.

The return value or parameter format changes required that an intraprocedure be written that adds extra overhead on each function call and makes it more difficult to maintain the software.

Additionally, stack monitoring techniques cannot guarantee that the old program/process is not performing a time critical task when the state transfer routine is initiated.

Also, the new program/process loses attributes associated with the old process such as the process ID, all the network connections, file connections, and the like, when the old process is terminated to restart within the new process.

In addition, to initiate state transfer one must insert an illegal instruction and assume there can be no other causes for this illegal instruction or trap, which would thereby make it possible to initiate a state transfer at the wrong time.

Heretofore, software users have lacked the ability to allow a program running in a process to be replaced with a new version of a program within the same process without loss of service or state.

SUMMARY OF THE INVENTION

The present invention is generally directed to an apparatus and method for on-line code replacement of a computer program running in a software process. In accordance with one aspect of the invention, the apparatus and method utilize a proposed variant of the UNIX™ exec system call, which will be referred to as a text-only exec.

In accordance with another embodiment of the apparatus and method of the present invention, a checkpoint methodology allows the programmer maximum flexibility in addressing upgrade/replacement program issues and determines where, when and how the transition to a new version of a program should occur with least impact to the services.

In accordance with another embodiment of the present invention, procedures have complete flexibility to change arguments or return values and change calling order, function names, function code and the like within the new version of the program since stack monitoring techniques are not being used.

In accordance with yet another embodiment, the present invention preserves all state based network connections during the transition to a new version of a program.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

Figure 1:
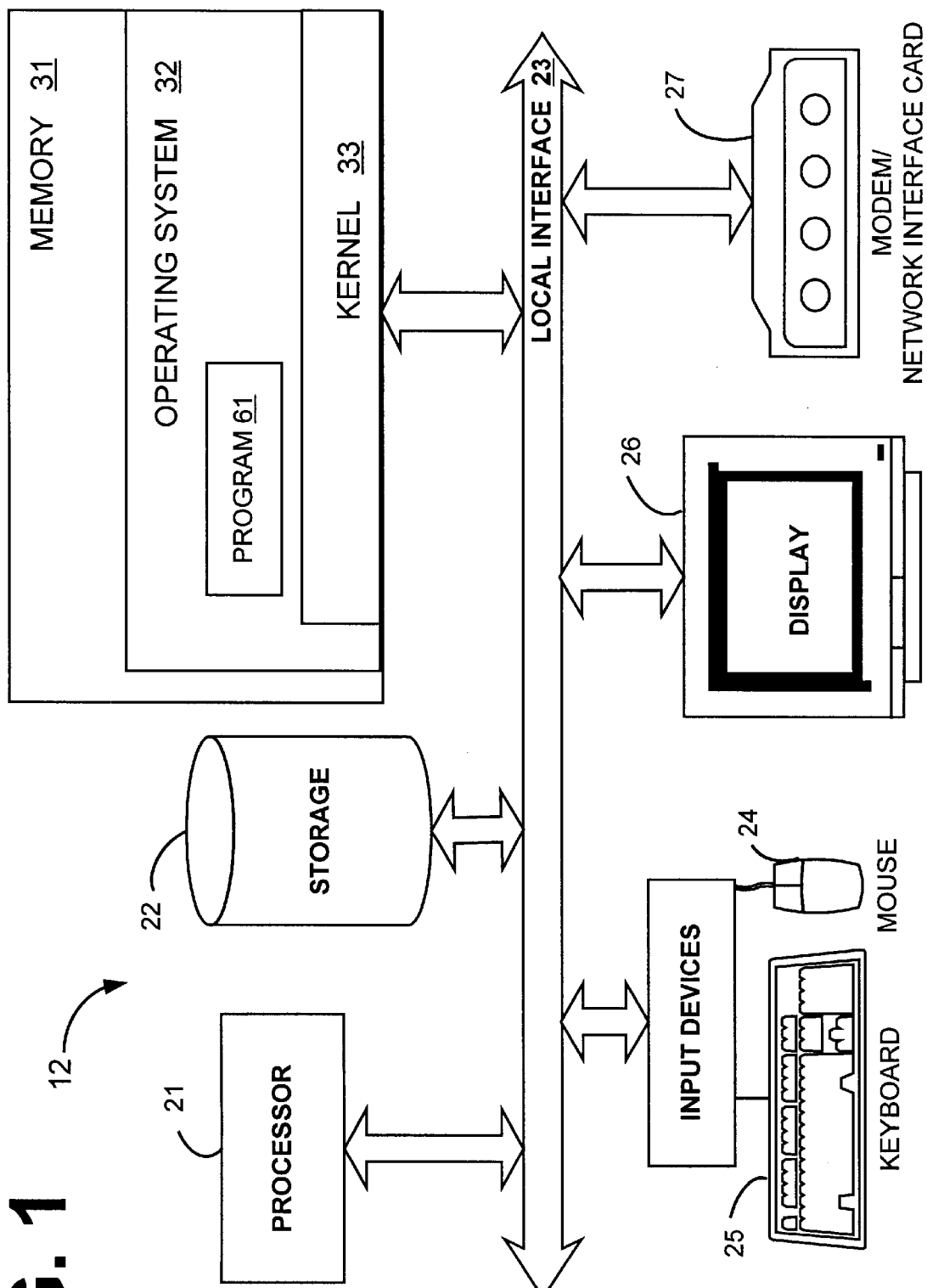
FIG. 1 is a block diagram of a user system processes in the operating system.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

As illustrated in FIG. 1, a computer system 12 generally comprises a processor 21, a storage device(s) 22, and system memory 31 with an operating system 32. Both the storage device 22 and memory 31 include instructions that are executed by the processor 21. Storage device(s) 22 can be, for example, in any one or combination of the following: compact disc read only memory (CD-ROM), disk, diskette, cartridge, cassette, ROM or the like. The memory 31 can be either one or a combination of the common types of memory such as for example, but not limited to, erasable programmable read only memory (EEPROM), flash memory, programmable read only memory (PROM), random access memory (RAM), read only memory (ROM), flash memory, Dynamic random access memory (DRAM), Static random access memory (SRAM), system memory, or the like. The processor 21 accepts data from memory 31 or storage device 22 over the local interface or bus 23. Direction from the user can be signaled by using an input device(s) for example, a mouse 24, keyboard 25, or the like. The action input and result output are displayed on the display terminal 26.

Figure 2:
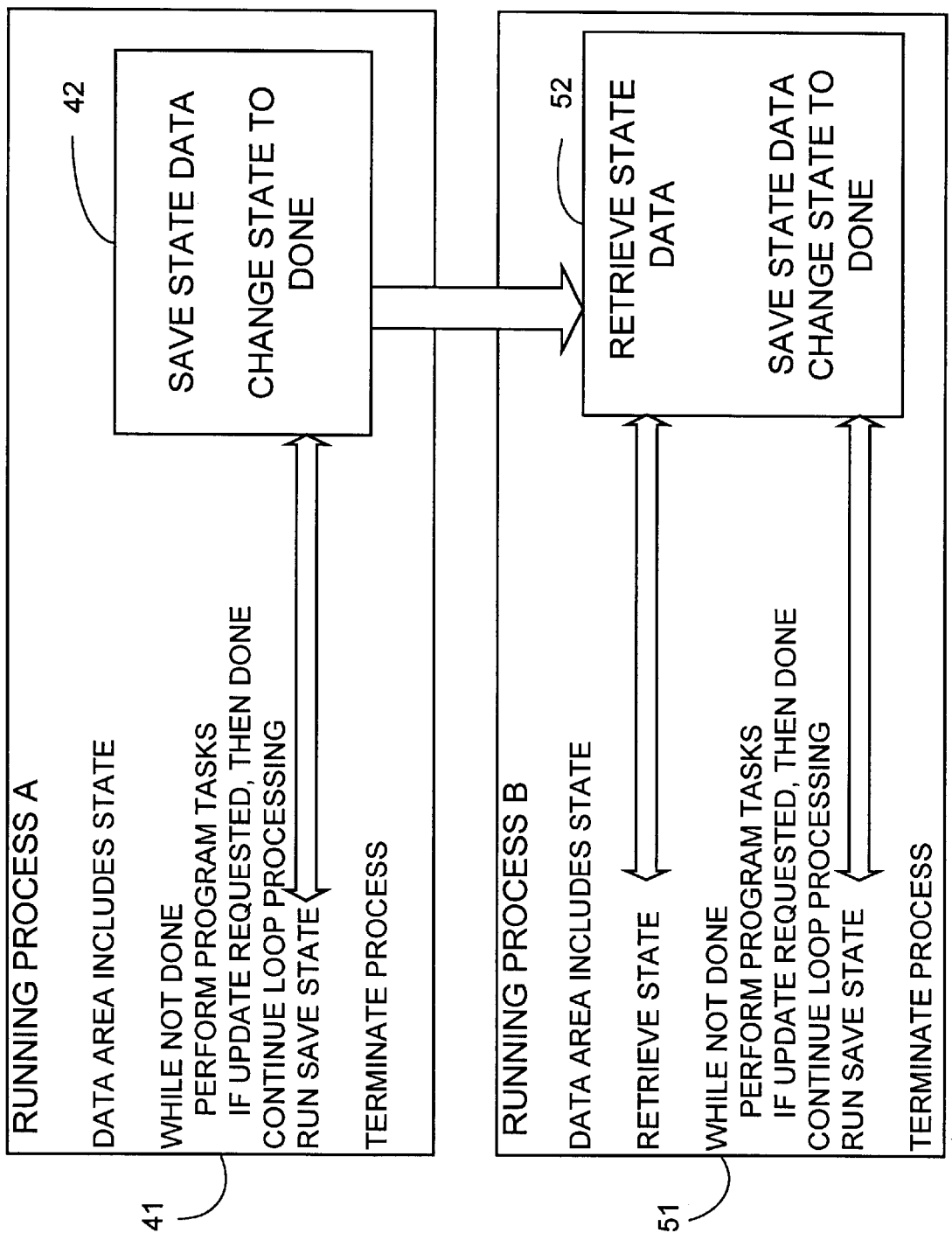
FIG. 2 is a block diagram showing the prior arts of state transition from a first program running within process A and transferring state to a second program within process B.

Illustrated in FIG. 2 is the well known method of updating a running process. Normally, when a process 41 is to be updated on-line, the program calls a state saving routine 42 that saves the state information of the program executing in process 41 (process A) to a data storage area (usually a file). Once the state data is saved, process 41 terminates and process 51 (process B) is executed. Process 51 retrieves the state data utilizing the retrieve state data routine 52. Then, while process 51 is not done, it performs the program task, and if an update is requested, then it is done and it continues the loop processing and repeats the steps in program running in process at 51. This method is time consuming and requires an extra data storage area for saving the state information.

Figure 3:
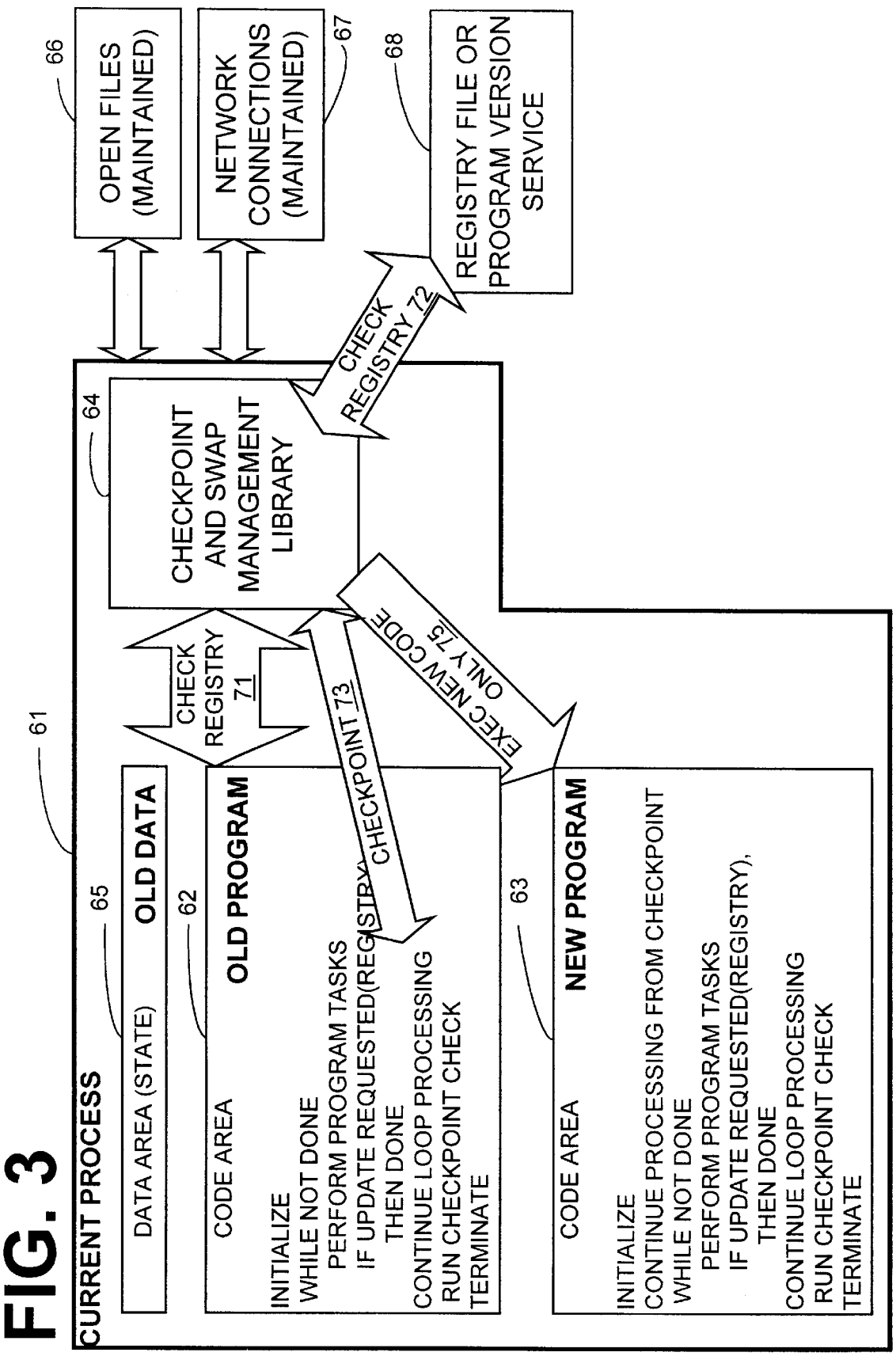
FIG. 3 is a block diagram of the present invention showing the flow between the old program within the current process to the new program running within the parent process.

Illustrated in FIG. 3 is online replacement of a program running in a process using the checkpoint system of the present invention. As current process 61 executes old program 62, old program 62 continuously checks to see if it is done. While the old program 62 is not done, old program 62 performs the program tasks to provide a service, performs a program update request check 71 and continues loop processing. While no update is requested, the old program 62 is set to not done.

In the preferred embodiment, the program update request check 71 is performed by the checkpoint and swap management library 64, and is accessed via the checkpoint 71 which further checks the registry file 68 via the check registry link 72.

The checkpoint and swap management library 64, when accessed, checks the registry file or program version service number 68, via the check registry communication 72. If the registry file or program version service 68 indicates that no new program version has been put in service, then the checkpoint in swap management library 64 returns a indication that indicates that no new program version has been put in service to the old program 62 via return of check 71.

In the event that a new program version is to be placed in service, the checkpoint and swap management library 64 overlays the old program 62 with the new program 63 via the text-only exec command 75. The new program may contain new or deleted variables and/or routines.

The new program 63 then continues processing from the checkpoint utilizing the state information acquired from the process data area. The new program 63 then continues processing while not done and continuously performs the registry check 71, performs the program task and loops until done as described above with regard to program 62.

The current process 61, the program that controls the operation of the old program 62 and new program 63, the old program 62, the new program 63, the checkpoint and swap management library 64, and the registry 68 of the present invention all can be implemented in hardware, software, firmware, or a combination thereof. In the preferred embodiment(s), the current process 61, old program 62, new program 63, checkpoint and swap management library 64, and the registry 68 are implemented in software or firmware that is stored in a memory and that is executed by a suitable instruction execution system.

Figure 4:
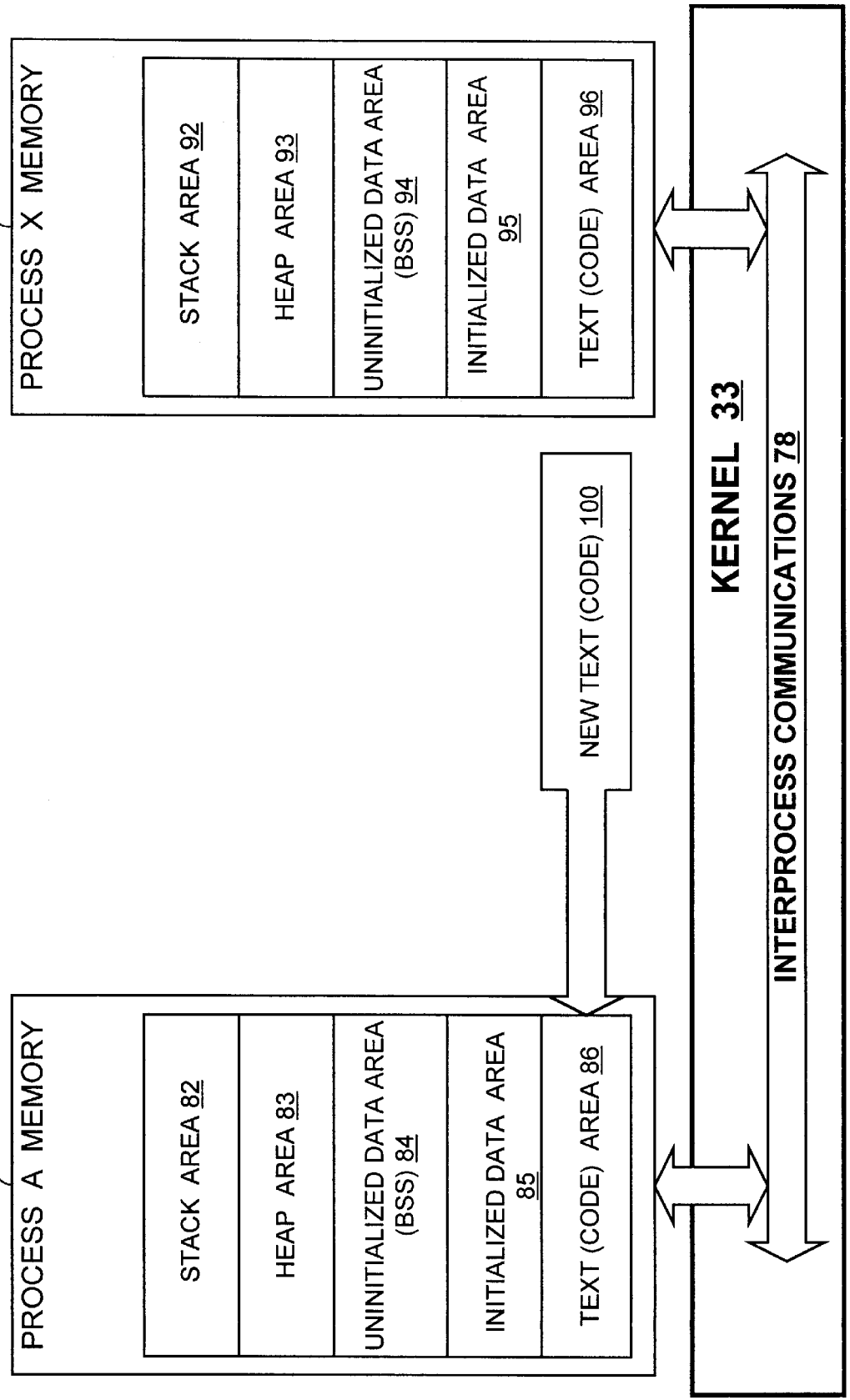
FIG. 4 is a block diagram showing the memory layout of a process within the operating system as shown in FIG. 1.

Illustrated in FIG. 4 is the memory map of each user process for the system illustrated in FIG. 1. The kernel 33 provides interprocess communication 78 for allowing interprocess communication. Process A memory 81 includes stack area 82, heap area 83, the uninitialized data area 84, initialized data area 85, and the text or program code area 86. Process X memory 91 and any other process also includes stack area 92, heap area 93, the uninitialized data area 94, initialized data area 95, and the text or program code area 96 in their process.

In the present invention when a new version of a program is to be used to replace an older version of a program running in a process, only the new text or code portion of the process need be updated. The new text or code portion 100 shows text segment being updated within the memory area 81 of process A. The area in memory 81 of process A being updated is the text code area 86 which is replaced with the new text code 100. All of the other memory areas remain the same and only the text code area 86 is updated.

Figure 5:
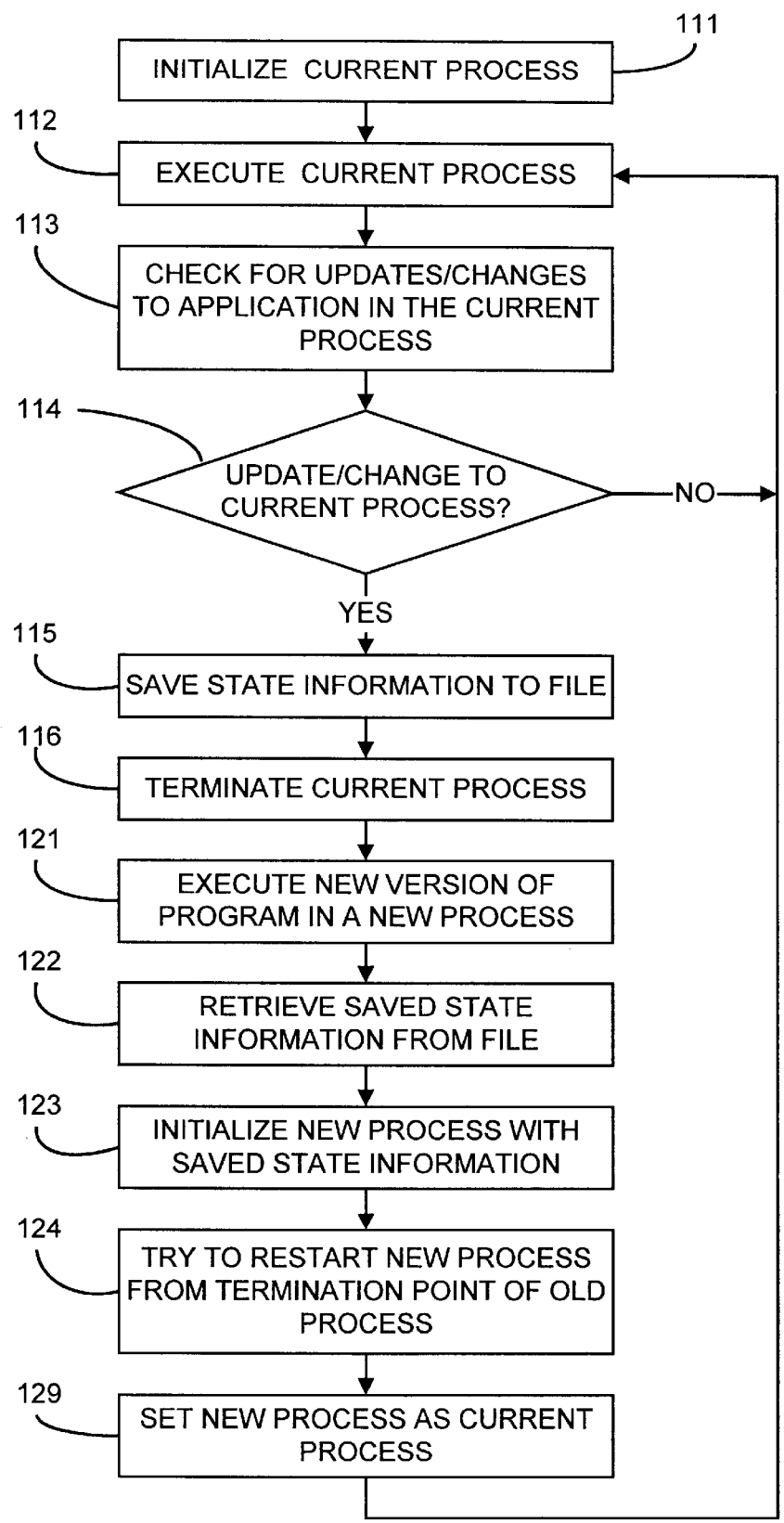
FIG. 5 is a flow chart of the prior art method for transitioning from program 1 in process A to an updated program B in process 2 as shown in FIG. 2.

Illustrated in FIG. 5 is the prior methodology of performing an online update of a program version. The current process 41 is initialized at step 111 and executed at step 112. A check for updates or changes to an application in the current process 41 is performed at step 113. If the update or change to current process check is negative, then the current process 41 continues executing by returning to step 112. If the update/change to the current process 41 is affirmative at step 114, then the state information of the current process 41 is saved to a state information file at step 115. Next, the current process 41 is terminated at step 116.

Execution of the new version of a program in a new process 51 is performed at step 121. The new version of a program in a new process 51 with a new process ID first retrieves the state information from the state information file at step 122. The new version of the program in a new process 51 then initializes the new process 51 with the saved state information retrieved from the stack or file at step 123, and then the new process attempts to restart from the termination point of the old process 41 at step 124. Then the new process 51 is set as a current process 129 and continues execution at step 112. As further illustrated at FIG. 5, it is shown that the prior art requires execution of the new version of the program in a new process.

Figure 6:
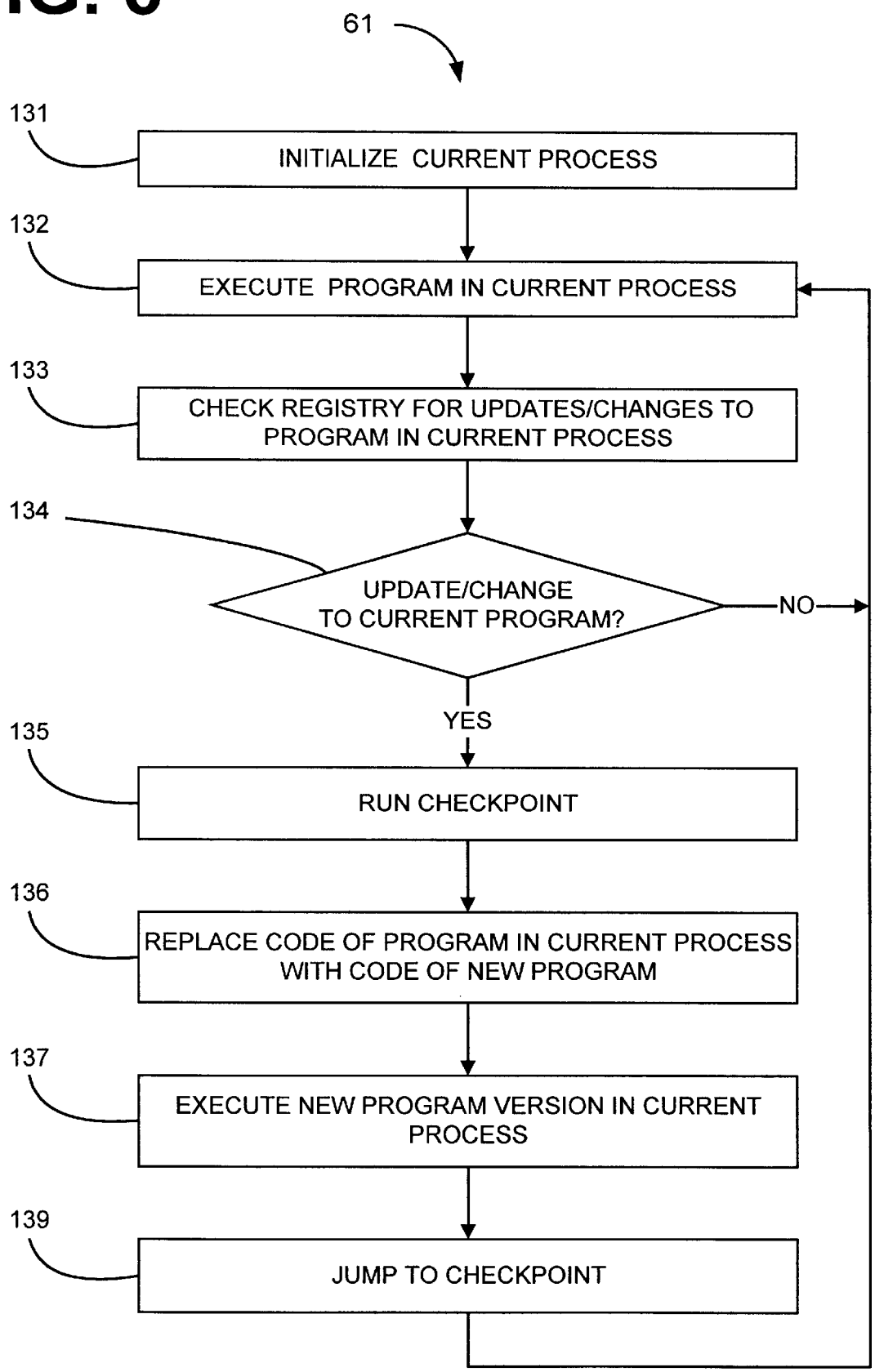
FIG. 6 is a flow chart of the method to update/replace the program within process A by utilizing checkpoints as shown in FIG. 3.

Illustrated in FIG. 6 is the apparatus and method of the present invention that does not require termination of the old process to execute a new version of a program to provide a service. First, the current process 61 is initialized at step 131 and the current process 61 executes the old program 62 while not done at step 132. At step 133, the current process 61 checks the registry 68, via link 72, for updates or changes to the old program 62. The check for updates or changes to the old program 62 also includes accessing a program version service 64 as described with regard to FIG. 3. If there is not an update or change to the old program 62 indicated at step 134, the current process 61 returns to step 132 to continue execution of the old program 62 to provide the service.

If at step 134 the update or change to a current program 62 within the current process 61 is indicated, then the current program 62 runs a checkpoint 73 at step 135. Next, the current process 61 replaces the text (code) area 86 with the code 100 of the new version of the program 63 at step 136. In the preferred embodiment, the program changes within a process are restricted to changes to the text portion (i.e., control flow) and automatic variables (i.e., stack variables) only. The text-only changes are provided for by a kernel or loader call to reload only the text portion of the process, leaving the data segment and shared segments alone. Leaving the data segments and shared segments alone places the additional constraint on the references to the data areas that must be maintained, since there is no movement of data variables other than automatic variables. This however, simplifies the swap process since no data variable transport is necessary.

In the preferred embodiment, a linker is utilized to control the placement of the variables thereby guaranteeing that the variables in the new version remain in the same place. Any new global variables can be added, as long as the new global variables are added beyond the prior program version data allocation or where holes are left from global variables no longer used in the new version. This assumes that there is an unused area between the data and the heap. Global variable references can also be removed, but holes will be left in memory where global variables have been deleted. It is possible for a programmer to delete global variables and utilize the heap area with definition of new variables, however, the programmer must insure that the data area is initialized. If the programmer programs into the framework in which the program will be swapped, the programmer may be able to apply greater changes by creatively making changes within the constraint areas, for example, solving a defect using only automatic variables even when the obvious fix would be to use another global variable, etc.

The linker could be fed the original program or a map file that describes the data layout of the original program in order to determine how to layout the new program's data so that the new program layout corresponds with the old program layout. In the instances when a kernel is utilized, the kernel, when it receives a text-only exec, will do everything it does in a normal exec call except leave the data segment intact. The kernel then requests the loader to only load the text in and then fix-up any linkage tables that reside in the data segment to have them point to the new function locations.

Next, the new program version 63 in the current process 61 is executed at step 137 to provide the service. Once the new program 63 is initialized within current process 61, the new program 63 then jumps to the checkpoint location at step 139 for subsequent execution. The current process 61, returns to step 132 to execute new program 63 to provide the service, and repeats the foregoing method.

The on-line code replacement of a running program comprises an ordered listing of executable instructions for implementing logical functions and can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium can even be paper or another suitable medium upon which the program is printed, as the program can be electronically captured via, for instance, optical scanning of the paper or other medium, then compiled, interpreted or otherwise processed in a suitable manner, if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer apparatus for online program replacement comprising:

a means for executing a current program that performs a task;

a means for maintaining data of said current program;

a checkpoint means for placing said current program in a predetermined state;

a means for determining if a new program exists for providing saidtask by referencing a list of programs;

a means for terminating said current program in said predetermined state;

a means for retrieving said data of said current program for use by said new program during the execution of said new program; and wherein said executing means executes said new program to performs said task if said new program exists.

2. The apparatus of claim 1, wherein said executing means further comprises:

a means for loading said new program into a space area of said current program.

3. The apparatus of claim 1, further comprising:

a means for preserving state data, wherein said state data is selected from the group consisting of network connections, open files, shared memory segments, process permissions, and other process attributes.

4. The apparatus of claim 1, wherein said executing means can change an operational characteristic of said new program, wherein said operational characteristic is selected from the group consisting of arguments, return values, calling order of a function, function names, and function code.

5. The apparatus of claim 1 wherein said determining means further comprises:

a means for accessing a registry file to determine if said new program exists for providing said task.

6. A method for use in a computer system for online program replacement, the method comprising the steps of:

running a current program that performs a task;

maintaining data of said current program;

using a checkpoint to place said current program in a predetermined state;

determining if a new program code exists for performing said task by referencing a list of new programs;

executing said new program to provide said task if said new program exists;

terminating said current program in said predetermined state; and retrieving said data of said current program for use by said new program during the execution of said new program.

7. The method of claim 6, wherein said executing step further comprises the step of:

loading said new program into a code area of said current program.

8. The method of claim 6, further comprising the step of:

preserving state data, wherein said state data is selected from the group consisting of network connections, open files, shared memory segments, process permissions, and other process attributes.

9. The method of claim 6, wherein said executing step further comprises the step of:

allowing said new program to change an operation characteristic of said new program operation, wherein said operation characteristic is selected from the group consisting of arguments, return values, calling order of a function, function names, and function code.

10. The method of claim 6, wherein said determining step further comprises the step of:

accessing a registry file to determine if said new program exists for providing said task.

11. An online program replacement apparatus comprising:

a task mechanism that performs a task;

a data mechanism that maintains data of said task mechanism;

a checkpoint mechanism that places said task mechanism in a predetermined state;

a new task determination mechanism that determines if a new task mechanism exists for performing said task, by referencing a list of task mechanisms;

a new task execution mechanism that executes said new task mechanism in said list of task mechanisms;

a terminate mechanism that terminates said task mechanism in said predetermined state; and a retrieve mechanism that retrieves said data of said task mechanism for use by said new task mechanism during execution of said new task mechanism.

12. The apparatus of claim 11, wherein said task mechanism further comprises:

a load mechanism that loads said new task mechanism into a code area of said task mechanism.

13. The apparatus of claim 11, further comprising:

a state data mechanism that preserves said state data, wherein said state data is selected from the group consisting of network connections, open files, shared memory segments, process permissions, and other process attributes.

14. The apparatus of claim 11, wherein said task mechanism further comprises:

a task mechanism that enables said new task mechanism to change a characteristic of operation of said new task mechanism, wherein said characteristic is selected from the group consisting of arguments, return values, calling order of a function, function names, and function code.

15. The apparatus of claim 11, wherein said new task determination mechanism further comprises:

an access mechanism that accesses a registry file to determine if said new program exists for providing said task.

16. A computer readable medium having a program for replacing programs online, said program replacing product comprising:

logic for performing a task;

logic for maintaining data of said task performing logic;

checkpoint logic for placing said task performing logic in a predetermined state;

logic for determining if a new task performing logic exists from a plurality of task performing logic;

logic for executing said new task performing logic if a new task performing logic exists;

a first routine means, responsive to the determinig logic, for terminating said task performing means in a predetermined state; and a second routine means, responsive to said executing logic, for retrieving said data for use by said new task performing means during the execution of said new task performing means.

17. The medium of claim 16, further comprising:

a forth routine logic, responsive to the executing logic, for loading said new task performing logic into a code area of said task performing logic.

18. The medium of claim 16, further comprising:

a fifth routine logic, responsive to the executing logic, for preserving state data, wherein said state data is selected from the group consisting of network connections, open files, shared memory segments, process permissions, and other process attributes.

19. The medium of claim 16, further comprising:

a sixth routine means, responsive to the executing logic, for enabling said new task performing logic to change a operation characteristic of said new task performing logic, wherein said operation characteristic is selected from the group consisting of arguments, return values, calling order of a function, function names, and function code.

20. The medium of claims 16, wherein said logic for determining further comprises:

a seventh routine means, responsive to the determining logic, for accessing a registry file to determine if said new program exists for providing said task.

* * * * *